United States Patent
Kawahara et al.

(10) Patent No.: US 8,513,033 B2
(45) Date of Patent: Aug. 20, 2013

(54) METHOD, DESIGN APPARATUS, AND DESIGN PROGRAM OF SEMICONDUCTOR DEVICE, AND SEMICONDUCTOR DEVICE

(75) Inventors: Naoyoshi Kawahara, Kanagawa (JP); Shinya Maruyama, Kanagawa (JP); Shinichi Miyake, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 414 days.

(21) Appl. No.: 12/911,285

(22) Filed: Oct. 25, 2010

(65) Prior Publication Data

US 2011/0095374 A1 Apr. 28, 2011

(30) Foreign Application Priority Data

Oct. 23, 2009 (JP) ................................. 2009-244362

(51) Int. Cl.
*H01L 21/00* (2006.01)

(52) U.S. Cl.
USPC ... 438/14; 438/17; 257/E21.244; 257/E21.314; 257/E23.141; 257/E29.226

(58) Field of Classification Search
USPC ............ 438/12–17, 484; 257/E21.244, 314, 257/521, 616, 23.141, 29.024, 226
See application file for complete search history.

(56) References Cited

U.S. PATENT DOCUMENTS

| | | | | |
|---|---|---|---|---|
| 4,896,278 A | * | 1/1990 | Grove | 702/36 |
| 7,114,144 B2 | * | 9/2006 | Tokunaga et al. | 716/52 |
| 7,332,380 B2 | * | 2/2008 | Matsuda | 438/140 |
| 7,849,436 B2 | * | 12/2010 | Young | 716/53 |
| 8,285,031 B2 | * | 10/2012 | Kitamura et al. | 382/145 |
| 8,312,408 B2 | * | 11/2012 | Itagaki | 716/124 |
| 8,356,269 B2 | * | 1/2013 | Fukuda | 716/132 |
| 2004/0148584 A1 | * | 7/2004 | Tokunaga et al. | 716/21 |
| 2006/0094190 A1 | * | 5/2006 | Matsuda | 438/258 |
| 2007/0009147 A1 | * | 1/2007 | Tokunaga et al. | 382/144 |
| 2008/0179754 A1 | * | 7/2008 | Hirabayashi | 257/773 |
| 2008/0272457 A1 | * | 11/2008 | Anderson et al. | 257/531 |
| 2009/0319973 A1 | * | 12/2009 | Anderson et al. | 716/9 |
| 2010/0090320 A1 | * | 4/2010 | Anderson et al. | 257/629 |
| 2010/0303334 A1 | * | 12/2010 | Kitamura et al. | 382/141 |

FOREIGN PATENT DOCUMENTS

| | | |
|---|---|---|
| JP | 2008-171170 | 7/2008 |
| JP | 2008-211214 | 9/2008 |

* cited by examiner

*Primary Examiner* — Michael Lebentritt
(74) *Attorney, Agent, or Firm* — Young & Thompson

(57) ABSTRACT

A design method of a semiconductor device includes setting an inspection region of layout data generated based on circuit data, calculating an area ratio of a first area to a second area, the first area indicating an area of the inspection region, the second area indicating a sum of a surface area of a plane that a first member contacts with a second member, the second member contacting with the first member constituting a circuit element included in the inspection region, the second member further having different heat reflective properties from the first member, and arranging a dummy element in the layout data so that the area ratio is within a predetermined range in each inspection region of the layout data.

9 Claims, 8 Drawing Sheets

METHOD, DESIGN APPARATUS, AND DESIGN PROGRAM OF SEMICONDUCTOR DEVICE, AND SEMICONDUCTOR DEVICE

INCORPORATION BY REFERENCE

This application is based upon and claims the benefit of priority from Japanese patent application No. 2009-244362, filed on Oct. 23, 2009, the disclosure of which is incorporated herein in its entirety by reference.

BACKGROUND

1. Field of the Invention

The present invention relates to a design method, a design apparatus, a design program of a semiconductor device, and a semiconductor device, and more specifically, to a design method, a design apparatus, and a design program of a semiconductor device that suppress characteristic variations of semiconductor elements in manufacturing, and a semiconductor device designed by the design method, the design apparatus, and the design program.

2. Description of Related Art

In recent years, advancement of technique for achieving segmentation of manufacturing processes attains high performance in functions to be mounted in semiconductor devices. However, segmentation of the manufacturing processes makes it difficult to suppress structural variations of the semiconductor elements caused in manufacturing, which increases characteristic variations of semiconductor elements. Since the characteristic variations of semiconductor elements influence on the yield, suppression of characteristic variations is important to stably produce semiconductor devices.

One of the methods of suppressing characteristic variations of semiconductor elements in manufacturing is disclosed in Japanese Unexamined Patent Application Publication No. 2008-211214. In the technique disclosed in Japanese Unexamined Patent Application Publication No. 2008-211214, a dummy element is inserted into a layout pattern of the semiconductor device. Accordingly, the technique disclosed in Japanese Unexamined Patent Application Publication No. 2008-211214 decreases the difference in pattern density for each area in the chip, and suppresses the variations in the device structure caused in the etching processing in the manufacturing process.

However, another factor that causes structural variations of semiconductor elements is heating variations in an annealing process that diffuses impurities in a diffusion region of semiconductor elements. The technique disclosed in Japanese Unexamined Patent Application Publication No. 2008-211214 cannot suppress characteristic variations of semiconductor elements in this annealing process.

In the annealing process, a semiconductor substrate is heated to diffuse impurities implanted into the semiconductor substrate. At this time, the diffusion state of impurities is varied according to the heating condition or the amount of impurities implanted therein. Moreover, in recent years, a technique called lamp annealing is employed in the annealing process in order to reduce the time required for manufacturing. In the lamp annealing, the semiconductor substrate is heated in an extremely short time (for example, a few seconds (spike lamp annealing), 0.1 msec to 100 msec (millisecond lamp annealing)). On the other hand, the semiconductor element is composed of a plurality of regions, and a first member (for example, diffusion region) and a second member (for example, device isolation region, gate electrode, and so on) forming a plurality of regions have different heat reflective properties. Thus, when the semiconductor device is manufactured by the lamp annealing process, there is caused variations in the heating state according to the ratio of the first member to the second member. When the semiconductor device is manufactured using the lamp annealing, an influence of heating variations due to the ratio of the members prominently appears. A method of suppressing the structural variations in the semiconductor elements in such annealing process is disclosed in Japanese Unexamined Patent Application Publication No. 2008-171170.

Japanese Unexamined Patent Application Publication No. 2008-171170 discloses a semiconductor wafer structure that includes a first device including epitaxially-grown silicon germanium of a first reflectance ratio and a second device including monocrystal silicon of a second reflectance ratio, in which a non-functional dummy first device including silicon germanium and a non-functional dummy second device including monocrystal silicon are distributed for the whole wafer so as to achieve the same overall ratio and the density as the distribution of the first and second devices. Accordingly, in the technique disclosed in Japanese Unexamined Patent Application Publication No. 2008-171170, uniform temperature change for the whole wafer is attained in the lamp annealing process.

SUMMARY

In the lamp annealing process, heat transfer is caused in the three-dimensional way. However, the technique disclosed in Japanese Unexamined Patent Application Publication No. 2008-171170 only considers, among the structures of the semiconductor elements, the two-dimensional area ratio: the non-functional dummy first device and the first device including silicon germanium and the non-functional dummy second device and the second device including monocrystal silicon. Therefore, according to the technique disclosed in Japanese Unexamined Patent Application Publication No. 2008-171170, it is impossible to suppress characteristic variations of semiconductor elements due to variations in the heating state caused according to the area of contact surface of the first member and the second member.

A first exemplary aspect of an embodiment of the present invention is a design method of a semiconductor device, including setting an inspection region of layout data generated based on circuit data, calculating an area ratio of a first area to a second area, the first area indicating an area of the inspection region, the second area indicating a sum of a surface area of a plane that a first member contacts with a second member, the second member contacting with the first member constituting a circuit element included in the inspection region, the second member further having different heat reflective properties from the first member, and arranging a dummy element in the layout data so that the area ratio is within a predetermined range in each inspection region of the layout data.

A second exemplary aspect of an embodiment of the present invention is a semiconductor device comprising a circuit element and a dummy element, the circuit element arranged based on circuit data, the dummy element arranged independently from the circuit element, in which a difference between a first region area and a second region area is within a predetermined range, the first region area indicating a sum of a surface area of a plane that a first member contacts with a second member, the first member forming the circuit element and the dummy element arranged in a first region of the semiconductor device, the second member having different heat reflective properties from the first member, the second region area indicating a sum of a surface area of a plane that a first member contacts with a second member, the first member forming the circuit element and the dummy element arranged in a second region having the same area with the first region, the second member having different heat reflective properties from the first member.

A third exemplary aspect of an embodiment of the present invention is a design apparatus of a semiconductor device that corrects layout data generated based on circuit data in consideration of variations occurred in manufacturing, the design apparatus including an inspection region set unit that sets a plurality of inspection regions obtained by dividing the layout data, an area ratio calculation unit that calculates an area ratio of a first area to a second area, the first area indicating an area of the inspection region, the second area indicating a sum of a surface area of a plane that a first member contacts with a second member, the second member contacting with the first member constituting a circuit element included in the inspection region, the second member further having different heat reflective properties from the first member, and a layout correction unit that arranges a dummy element for each inspection region based on the area ratio to adjust the area ratio so that the area ratio is within a predetermined range in each of the inspection regions.

A fourth exemplary aspect of an embodiment of the present invention is a non-transitory computer readable medium that stores a design program executed in an apparatus comprising an operation unit and a storing unit, the operation unit executing a program, the storing unit storing layout data generated based on circuit data, the design program executing the following processing of reading out the layout data from the storing unit to set a plurality of inspection regions obtained by dividing the layout data, calculating an area ratio of a first area to a second area, the first area indicating an area of the inspection region, the second area indicating a sum of a surface area of a second member, the second member contacting with the first member constituting a circuit element included in the inspection region, the second member further having different heat reflective properties from the first member, and arranging a dummy element for each inspection region based on the area ratio to adjust the area ratio so that the area ratio is within a predetermined range in each of the inspection regions.

According to the design method, the design apparatus, the design program of the semiconductor device, and the semiconductor device of the present invention, the dummy element is inserted into the layout data in consideration of the surface area of the second member contacted to the first member having different heat reflective properties. Hence, in the design method, the design apparatus, the design program of the semiconductor device, and the semiconductor device according to the present invention, the variations of the surface area of the second member contacted to the first member are smaller in the whole semiconductor chip, thereby suppressing characteristic variations of semiconductor elements due to the difference of heating states for each region in the lamp annealing process.

According to the design method, the design apparatus, the design program of the semiconductor device, and the semiconductor device of the present invention, it is possible to suppress characteristic variations of semiconductor elements.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Hereinafter, a first exemplary embodiment of the present invention will be described with reference to the drawings. A design method of a semiconductor device according to the present invention aims to reduce characteristic variations of a semiconductor element occurred in an annealing process. In the first exemplary embodiment, a MOS (Metal Oxide Semiconductor) transistor is used as the semiconductor element. The characteristic variations of the MOS transistor will now be described.

First, the current drive ability of the MOS transistor will be described. A drain-source current Ids of the MOS transistor is expressed by the following expression (1).

$$Ids = \mu eff \cdot \frac{Wg}{Lg} \left\{ \left( Vg - Vfb - 2\phi B - \frac{\sqrt{4\varepsilon si \cdot qNa\phi B}}{Cox} \right) \cdot Vds - \frac{m}{2} \cdot Vds^2 \right\} \quad (1)$$

The current drive ability of the MOS transistor is defined by the magnitude of the drain-source current. In the expression (1), μeff represents a carrier mobility, Wg represents a gate width (effective channel width), Lg is a gate length (effective channel length), Vg is a gate voltage, Vds is a drain-source voltage, Vfb is a flat band voltage, φB is a surface potential in a strong inversion state, εsi is a silicon conductivity, q is a charge amount, Cox is a gate insulation film capacitance, Na is a silicon impurity concentration, and m is a body effect coefficient.

Figure 1:
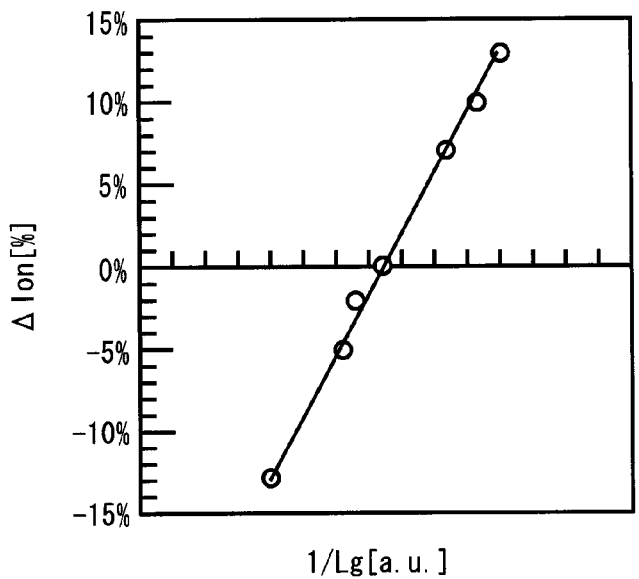
FIG. 1 is a graph showing a difference in properties due to a difference in a gate length of a transistor.

As shown in the expression (1), the current drive ability of the MOS transistor is inversely proportional to the gate length Lg and is proportional to the gate width Wg. FIG. 1 shows a graph showing a relation between the gate length Lg and the current drive ability of the MOS transistor. In the graph shown in FIG. 1, the vertical axis indicates the difference ΔIon between the current drive ability with respect to the standard gate length Lg and the current drive ability of the transistor having the gate length Lg which is deviated from the standard gate length Lg. As shown in FIG. 1, in the MOS transistor, the current drive ability decreases when the gate length Lg increases, and the current drive ability increases when the gate length Lg decreases.

Figure 2:
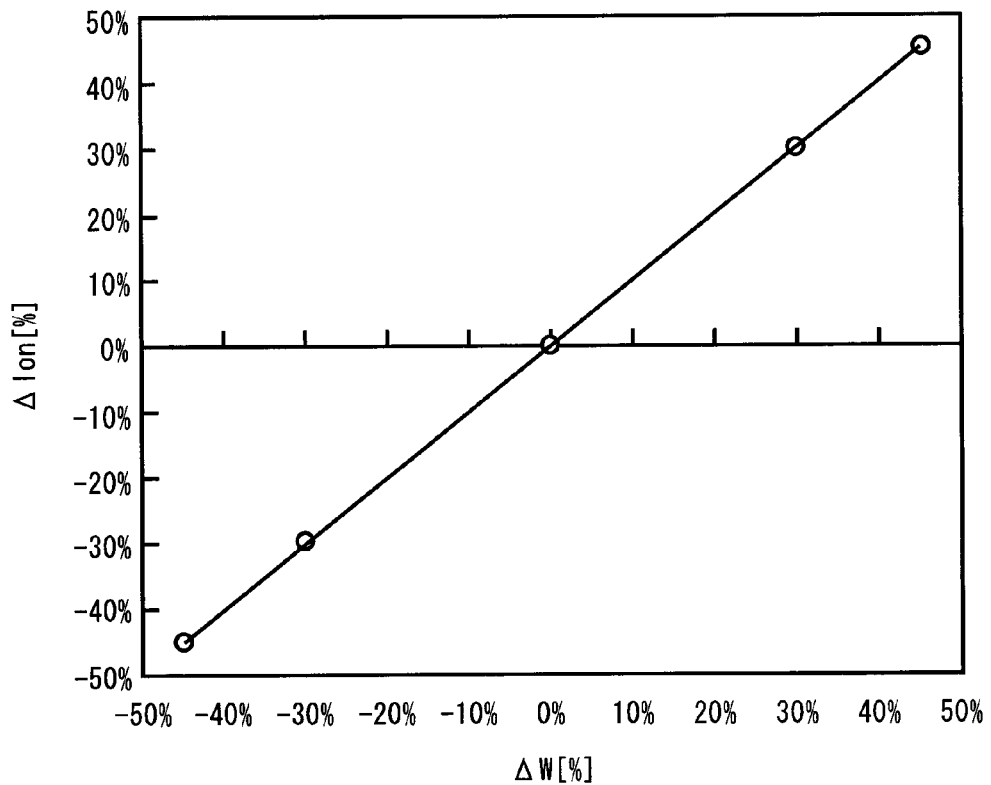
FIG. 2 is a graph showing a difference in properties due to a difference in a gate width of a transistor.

FIG. 2 shows a graph showing a relation between the gate width Wg and the current drive ability of the MOS transistor. Also in the graph shown in FIG. 2, the vertical axis indicates the difference Mon between the current drive ability with respect to the standard gate width Wg and the current drive ability of the transistor having the gate width Wg which is deviated from the standard gate width Wg. As shown in FIG. 2, in the MOS transistor, the current drive ability increases when the gate width Wg increases, and the current drive ability decreases when the gate width Wg decreases.

As described above, the properties of the MOS transistor vary according to the magnitude of the gate length Lg and the gate width Wg. On the other hand, when heating variations of the semiconductor substrate is caused in the annealing process in the circuit constituted by transistors having the same gate length Lg and the gate width Wg, there are raised variations in diffusion in impurities forming a diffusion region, which makes the gate length Lg (effective channel length) and the gate width Wg (effective channel width) different from those set in the design process. The variations of the gate length Lg and the gate width Wg are characteristic variations of the MOS transistor caused in the annealing process.

Figure 3:
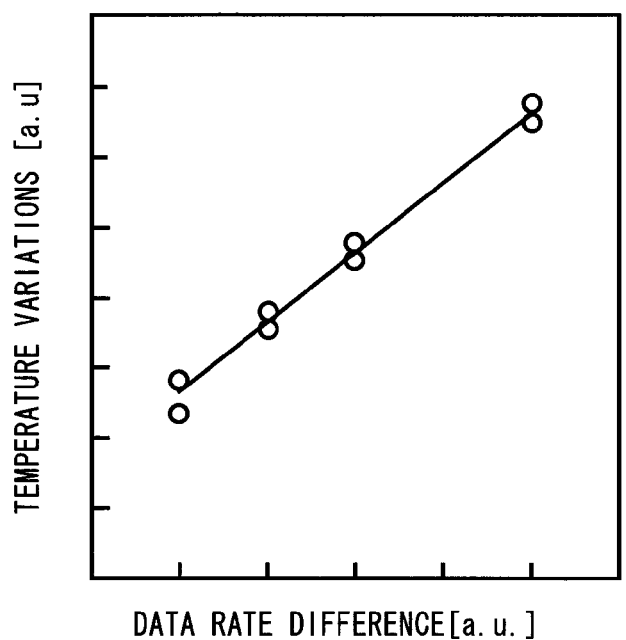
FIG. 3 is a graph showing temperature variations due to a difference in a data rate between a first member and a second member.

The heating variations are caused due to the contact area of a first member (for example, diffusion region) and a second member (for example, device isolation region or gate electrode) having different heat reflective properties with each other. FIG. 3 shows a graph showing a relation between the difference in the data rate between the first member and the second member on the layout data and the temperature variations of the semiconductor substrate. As shown in FIG. 3, the temperature variations of the semiconductor substrate increase with increasing the difference of the data rate.

In the first exemplary embodiment, the inspection region is extracted from the layout data of the semiconductor device. The dummy element is then inserted so as to allow the area ratio of the inspection region to be within a predetermined range (for example, target range which is set in advance) based on the ratio (this ratio will be hereinafter referred to as area ratio) of an area of the inspection region that is extracted (for example, first area) to an area indicating a sum of a surface area of a plane that the first member and the second member contacts (for example, second area). The second member contacts with the first member constituting the circuit element included in the inspection region, and has different heat reflective properties from the first member. The first exemplary embodiment thus reduces the difference of the area ratio of each inspection region, and makes the characteristic variations of the MOS transistor even for the whole chip. In the first exemplary embodiment, the area in side walls of the second member is calculated as the second area.

In the first exemplary embodiment, first to third calculation methods will be explained as the calculation method of the area ratio. In any of the first to third calculation methods, characteristic variations of the area ratio and the MOS transistor have a certain correlation. Thus, any of the first to third calculation methods can be used as the calculation method of the area ratio.

Figure 4:
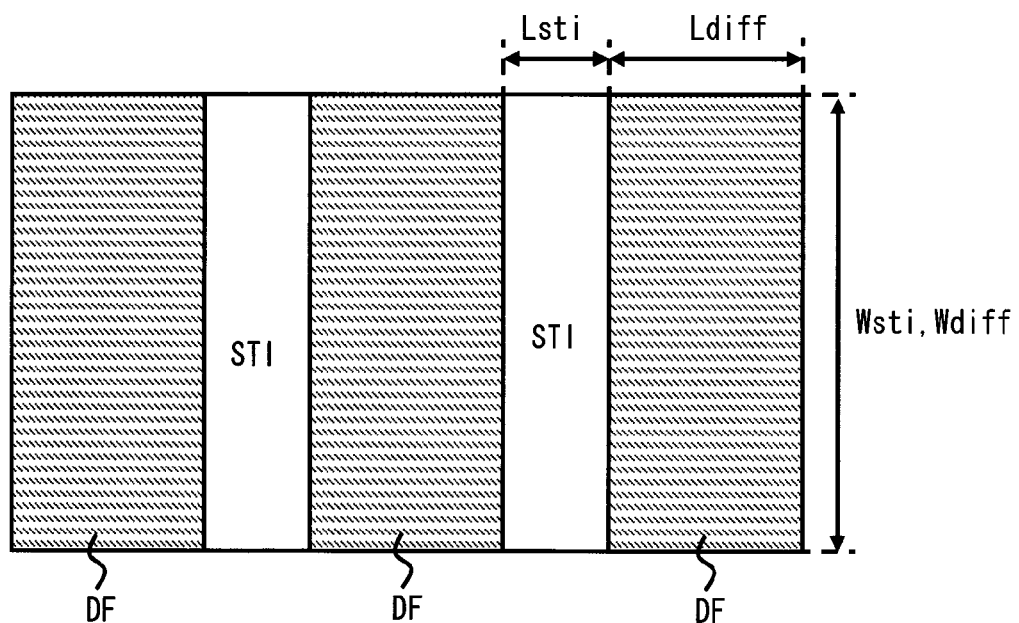
FIG. 4 is a schematic diagram of layout data of an inspection region of a semiconductor device for describing a first calculation method according to a first exemplary embodiment.

The first calculation method will be descried first. In the first calculation method, only the device isolation region is the calculation target of the second member. The calculation method of the first area X indicating the area of the inspection region in the first calculation method will be described. FIG. 4 shows the layout data of the inspection region. As shown in FIG. 4, the inspection region includes a diffusion region DF and a device isolation region STI. The first area X is expressed by the expression (2). In the expression (2), Asti represents a total area of the device isolation region STI, Asti1 and Asti2 represent areas of the first and second device isolation regions STI, respectively, Lsti is a length of the device isolation region STI, Wsti is a width of the device isolation region STI, Ad is a total area of the diffusion region DF, Ad1 to Ad3 are areas of the first to third diffusion regions DF, respectively, Ldiff is a length of the diffusion region DF, and Wdiff is a width of the diffusion region DF. In the example shown in FIG. 4, the first to third diffusion regions DF have the same area, and the first and second device isolation regions STI have the same area.

$$X = Asti + Ad = Asti1 + Asti2 + Ad1 + Ad2 + Ad3 = 2 \times (Lsti \times Wsti) + 3 \times (Ldiff + Wdiff) \quad (2)$$

Figure 5:
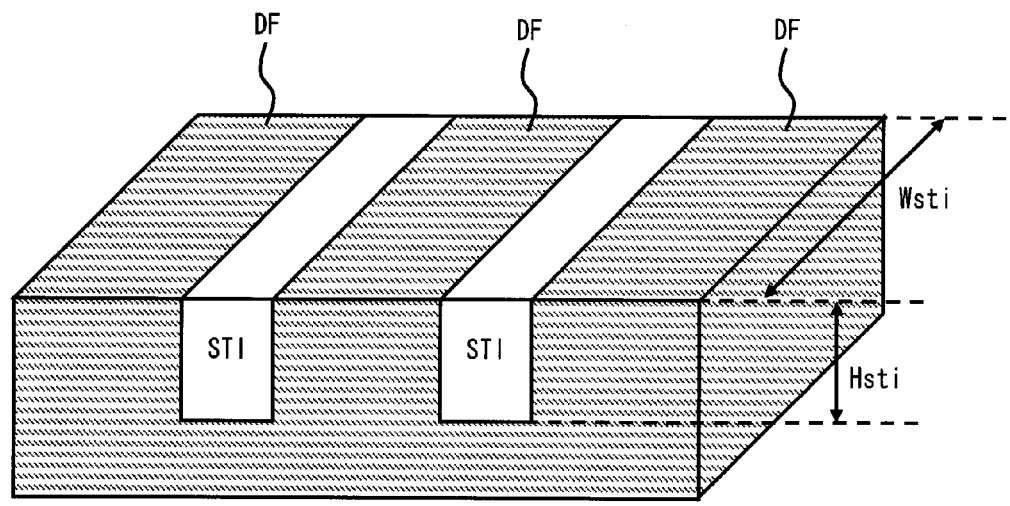
FIG. 5 is a schematic diagram showing a structure of the semiconductor device shown in FIG. 4.

Subsequently, the calculation method of the second area according to the first calculation method will be described. FIG. 5 shows a structure of the semiconductor device of a part corresponding to the layout data shown in FIG. 4. As shown in FIG. 5, the inspection region includes the diffusion region DF and the device isolation region STI. The second area Y is expressed by the expression (3). In the expression (3), SLd is a peripheral length of the diffusion region DF, Wsti is a width of the device isolation region STI, and Hsti is a depth of the device isolation region STI. In the example shown in FIG. 5, the area in which the two device isolation regions STI contact with the three diffusion regions DF is the same.

$$Y = Hsti \times SLd = Hsti \times 4 \times Wsti \quad (3)$$

The area ratio Ratio A according to the first calculation method is expressed by the following expression (4).

$$RatioA = \frac{(X+Y)}{X} = \frac{(Ad + Asti + SLd \times Hsti)}{X} = 1 + \frac{(SLd \times Hsti)}{X} \quad (4)$$

Figure 6:
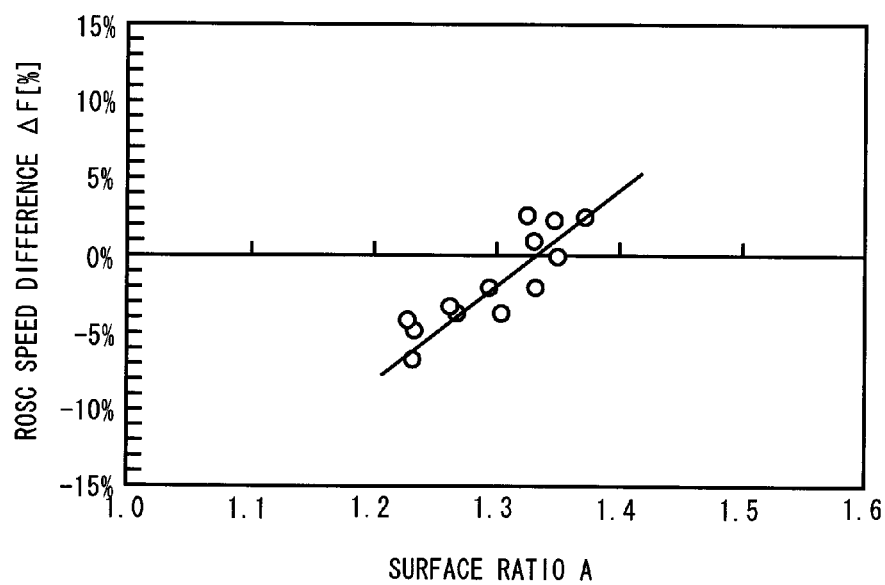
FIG. 6 is a graph showing characteristic variations of a transistor when the area ratio is different in the semiconductor device shown in FIG. 4.

FIG. 6 shows a relation between the area ratio Ratio A and the current drive ability of the MOS transistor. In FIG. 6, a change rate of an oscillation frequency of a ring oscillator composed of MOS transistors is used as an indicator of the current drive ability. High oscillation frequency indicates high current drive ability of the MOS transistor, and low oscillation frequency indicates low current drive ability of the MOS transistor.

As shown in FIG. 6, low area ratio Ratio A reduces the current drive ability of the MOS transistor, and high area ratio Ratio A increases the current drive ability of the MOS transistor. This is because the heat reflective property of the device isolation region STI is higher than that of the diffusion region DF. In other words, high area ratio Ratio A leads to increase in the temperature of the semiconductor substrate in the annealing process and further diffusion of impurities in the diffusion region, which causes shorter gate length of the MOS transistor that is completed. Further, as shown in FIG. 6, the current drive ability of the MOS transistor varies substantially linearly with respect to the change in the area ratio Ratio A.

Figure 7:
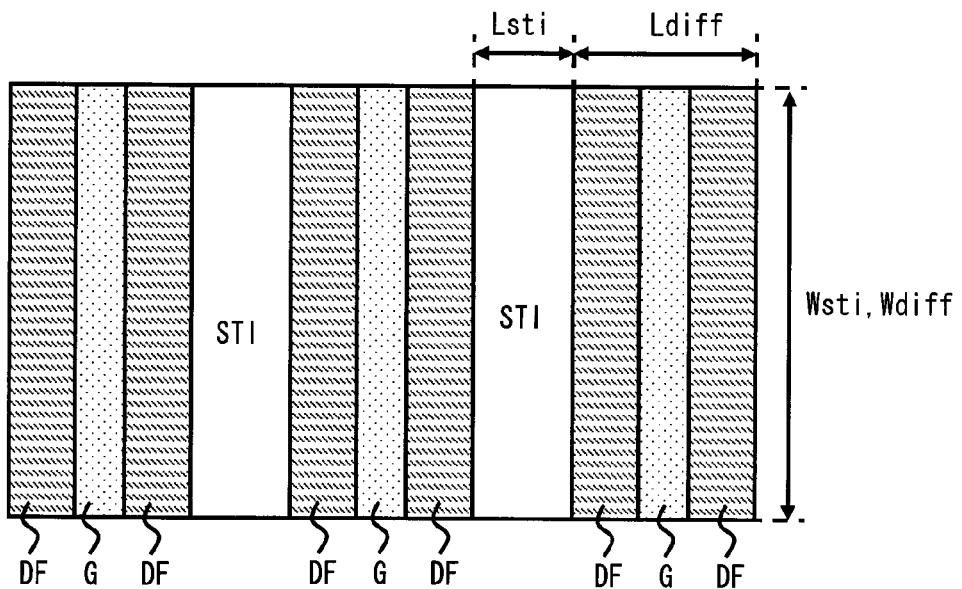
FIG. 7 is a schematic diagram of layout data in an inspection region of the semiconductor device for describing a second calculation method according to the first exemplary embodiment.

Next, the second calculation method will be explained. In the second calculation method, only the gate electrode is the calculation target of the second member. The calculation method of the first area X indicating the area of the inspection region in the second calculation method will be described. FIG. 7 shows layout data in the inspection region. As shown in FIG. 7, the inspection region includes the diffusion region DF, the device isolation region STI, and the gate electrode G. The first area X is expressed by the expression (5). In the expression (5), Asti represents a total area of the device isolation region STI, Asti1 and Asti2 are areas of the first and second device isolation regions STI, respectively, Lsti is a length of the device isolation region STI, Wsti is a width of the device isolation region STI, Ad is a total area of the diffusion region DF, Ad1 to Ad3 are areas of the first to third diffusion regions DF, respectively, Ldiff is a length of the diffusion region DF, and Wdiff is a width of the diffusion region DF. Assume that, in the example shown in FIG. 7, the area of the first to third diffusion regions DF is the same, and the area of the first and second device isolation regions STI is the same.

$$X=Asti+Ad=Asti1+Asti2+Ad1+Ad2+Ad3=2\times(Lsti\times Wsti)+3\times(Ldiff\times Wdiff) \quad (5)$$

Figure 8:
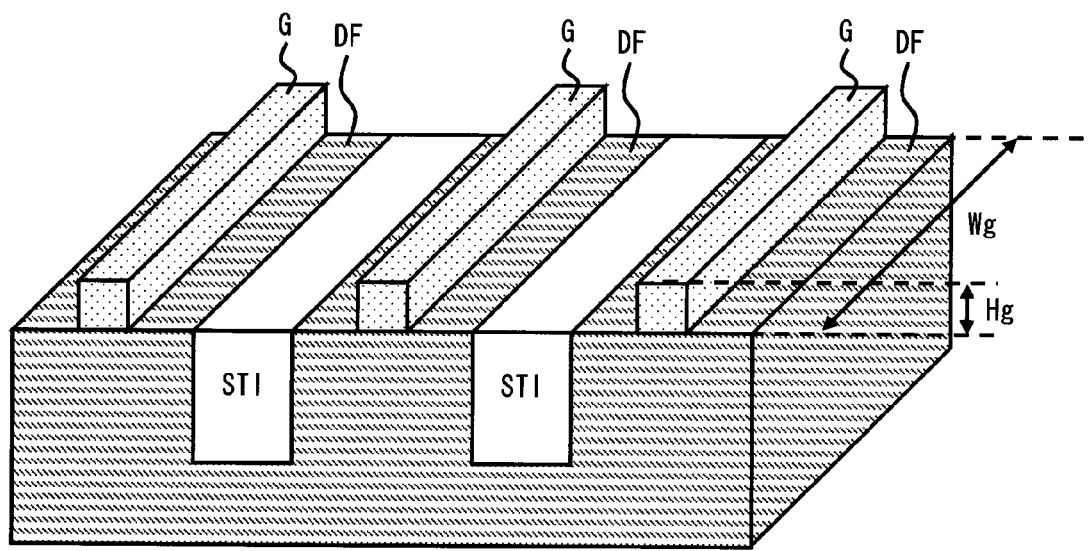
FIG. 8 is a schematic diagram showing a structure of the semiconductor device shown in FIG. 7.

Next, the calculation method of the second area according to the second calculation method will be described. FIG. 8 shows a structure of the semiconductor device of a part corresponding to the layout data shown in FIG. 7. As shown in FIG. 8, the inspection region includes the diffusion region DF, the device isolation region STI, and the gate electrode. The second area Y is expressed by the expression (6). In the expression (6), SLg represents a peripheral length of the gate electrode G, Wg represents a width of the gate electrode G, and Hg represents a height of the gate electrode G. In the example shown in FIG. 8, the width Wg and the height Hg of the three gate electrodes G are the same.

$$Y=Hg\times SLg=Hg\times 6\times Wg \quad (6)$$

The area ratio Ratio B according to the second calculation method is expressed by the expression (7).

$$RatioB = \frac{(X+Y)}{X} = \frac{(Ad+Asti+SLg\times Hg)}{X} = 1 + \frac{(SLg\times Hg)}{X} \quad (7)$$

Figure 9:
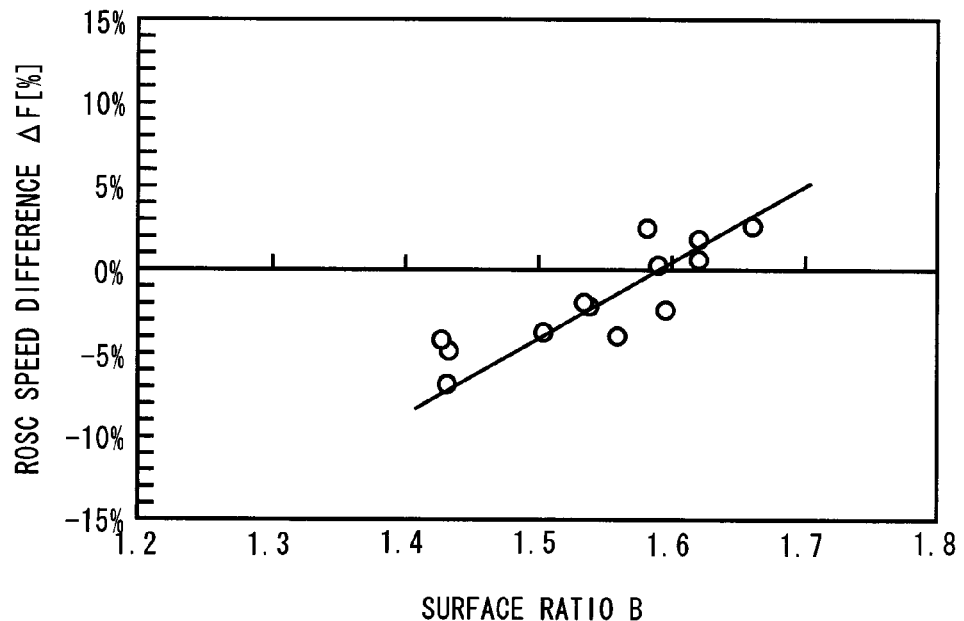
FIG. 9 is a graph showing characteristic variations of a transistor when the area ratio is different in the semiconductor device shown in FIG. 7.

FIG. 9 shows a relation between the area ratio Ratio B and the current drive ability of the MOS transistor. In FIG. 9, a change rate of an oscillation frequency of a ring oscillator composed of MOS transistors is used as an indicator of the current drive ability. High oscillation frequency indicates high current drive ability of the MOS transistor, and low oscillation frequency indicates low current drive ability of the MOS transistor.

As shown in FIG. 9, the current drive ability of the MOS transistor decreases with decreasing area ratio Ratio B, and the current drive ability of the MOS transistor increases with increasing area ratio Ratio B. This is because the heat reflective property in the gate electrode G is higher than that of the diffusion region DF. In other words, high area ratio Ratio B leads to increase in the temperature of the semiconductor substrate in the annealing process and further diffusion of impurities in the diffusion region, which causes shorter gate length of the MOS transistor that is completed. Further, as shown in FIG. 9, the current drive ability of the MOS transistor varies substantially linearly with respect to the change in the area ratio Ratio B.

Figure 10:
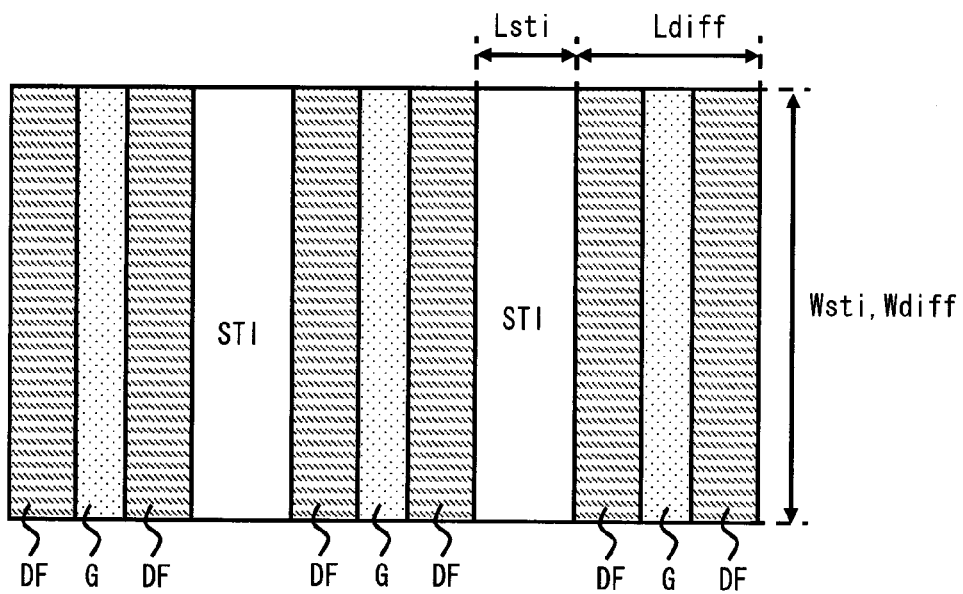
FIG. 10 is a schematic diagram of layout data in an inspection region of the semiconductor device for describing a third calculation method according to the first exemplary embodiment.

Next, the third calculation method will be described. In the third calculation method, the device isolation region and the gate electrode are the calculation target of the second member. The calculation method of the first area X indicating the area of the inspection region in the third calculation method will be described. FIG. 10 shows layout data of the inspection region. As shown in FIG. 10, the inspection region includes the diffusion region DF, the device isolation region STI, and the gate electrode G. The first area X is expressed by the expression (8). In the expression (8), Asti represents a total area of the device isolation region STI, Asti1, Asti2 represent areas of the first and second device isolation regions STI, respectively, Lsti represents a length of the device isolation region STI, Wsti represents a width of the device isolation region STI, Ad represents a total area of the diffusion region DF, Ad1 to Ad3 represent areas of the first to third diffusion regions DF, respectively, Ldiff represents a length of the diffusion region DF, and Wdiff represents a width of the diffusion region DF. Assume that, in the example shown in FIG. 10, the area of the first to third diffusion regions DF is the same, and the area of the first and second device isolation regions STI is the same.

$$X=Asti+Ad=Asti1+Asti2+Ad1+Ad2+Ad3=2\times(Lsti\times Wsti)+3\times(Ldiff\times Wdiff) \quad (8)$$

Figure 11:
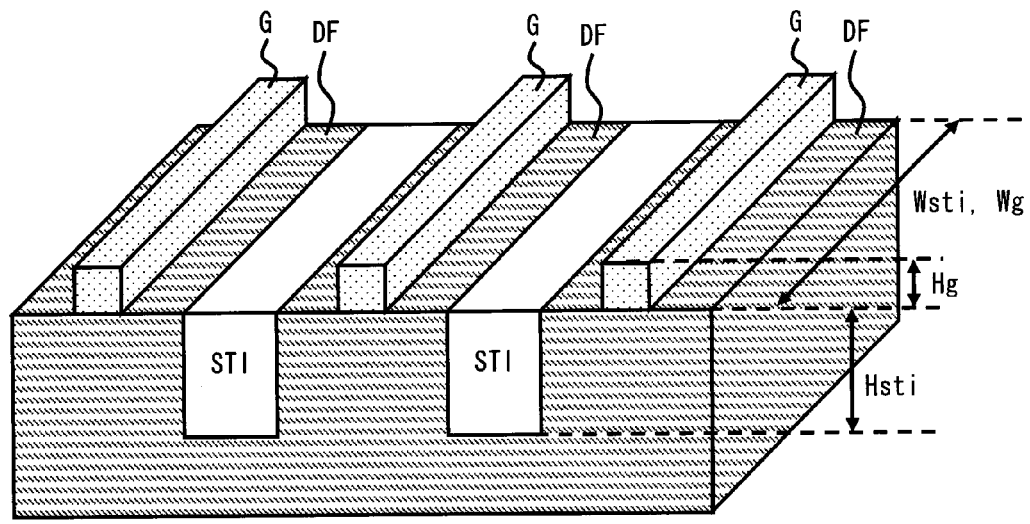
FIG. 11 is a schematic diagram showing a structure of the semiconductor device shown in FIG. 10.

Subsequently, the calculation method of the second area according to the third calculation method will be described. FIG. 11 shows a structure of the semiconductor device of a part corresponding to the layout data shown in FIG. 10. As shown in FIG. 11, the inspection region includes the diffusion region DF, the device isolation region STI, and the gate electrode. The second area Y is expressed by the expression (9). In the expression (9), SLd represents a peripheral length of the diffusion region DF, Wsti represents a width of the device isolation region STI, and Hsti represents a depth of the device isolation region STI. Further, SLg represents a peripheral length of the gate electrode G, Wg represents a width of the gate electrode G, and Hg represents a height of the gate electrode G. Assume that, in the example shown in FIG. 11, the area of the first to third diffusion regions DF is the same, the area of the first and second device isolation regions STI is the same, and the width Wg and the height Hg of the three gate electrodes G are the same.

$$Y=Hsti\times SLd+Hg\times SLg=Hsti\times 4\times Wsti+Hg\times 6\times Wg \quad (9)$$

The area ratio Ratio C in the third calculation method is expressed by the expression (10).

$$RatioB = \frac{(X+Y)}{X} = \frac{(Ad + Asti + SLd \times Hsti + SLg \times Hg)}{X} = \qquad (10)$$

$$1 + \frac{(SLd \times Hsti + SLg \times Hg)}{X}$$

Figure 12:
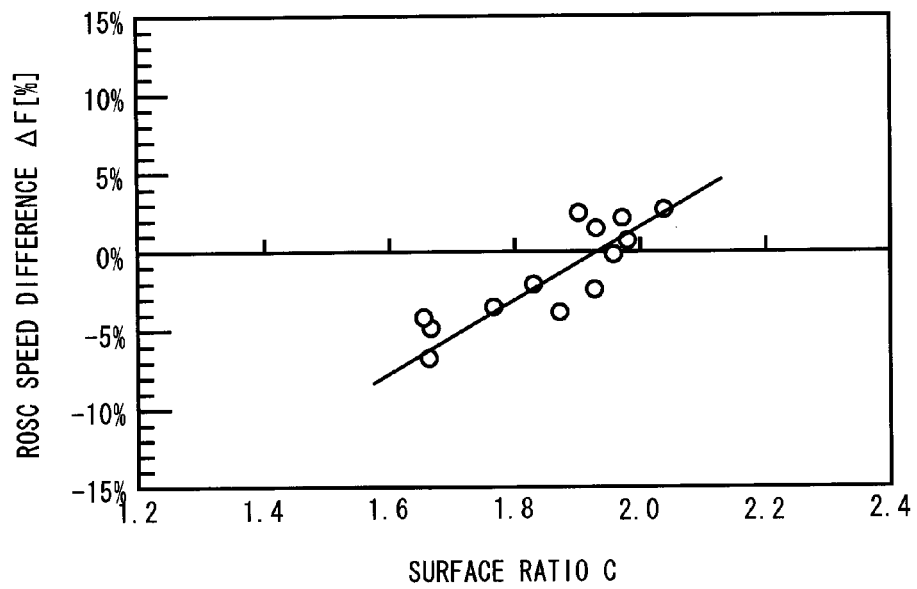
FIG. 12 is a graph showing characteristic variations of a transistor when the area ratio is different in the semiconductor device shown in FIG. 10.

FIG. 12 shows a relation between the area ratio Ratio C and the current drive ability of the MOS transistor. In FIG. 12, a change rate of an oscillation frequency of a ring oscillator composed of MOS transistors is used as an indicator of the current drive ability. High oscillation frequency indicates high current drive ability of the MOS transistor, and low oscillation frequency indicates low current drive ability of the MOS transistor.

As shown in FIG. 12, low area ratio Ratio C reduces the current drive ability of the MOS transistor, and high area ratio Ratio C increases the current drive ability of the MOS transistor. This is because the heat reflective property of the device isolation region STI and the gate electrode G is higher than that of the diffusion region DF. In other words, high area ratio Ratio C leads to increase in the temperature of the semiconductor substrate in the annealing process and further diffusion of impurities in the diffusion region, which causes shorter gate length of the MOS transistor that is completed. Further, as shown in FIG. 1, the current drive ability of the MOS transistor varies substantially linearly with respect to the change in the area ratio Ratio C.

As described above, the area ratio of the first area X to the second area Y has high correlation with the current drive ability of the MOS transistor. According to the design method of the semiconductor device of the first exemplary embodiment, the semiconductor chip is divided into a plurality of inspection regions, and the area ratio is obtained for each inspection region. Then, the dummy element is arranged so that the area ratio of the inspection region is within the predetermined range, thereby suppressing variations of the current drive ability of the MOS transistors of the whole chip. The dummy element that is inserted includes, for example, a first member and a second member. Further, a plurality of dummy elements having different area ratios (for example, area ratios of high/medium/low) are prepared in advance.

Figure 13:
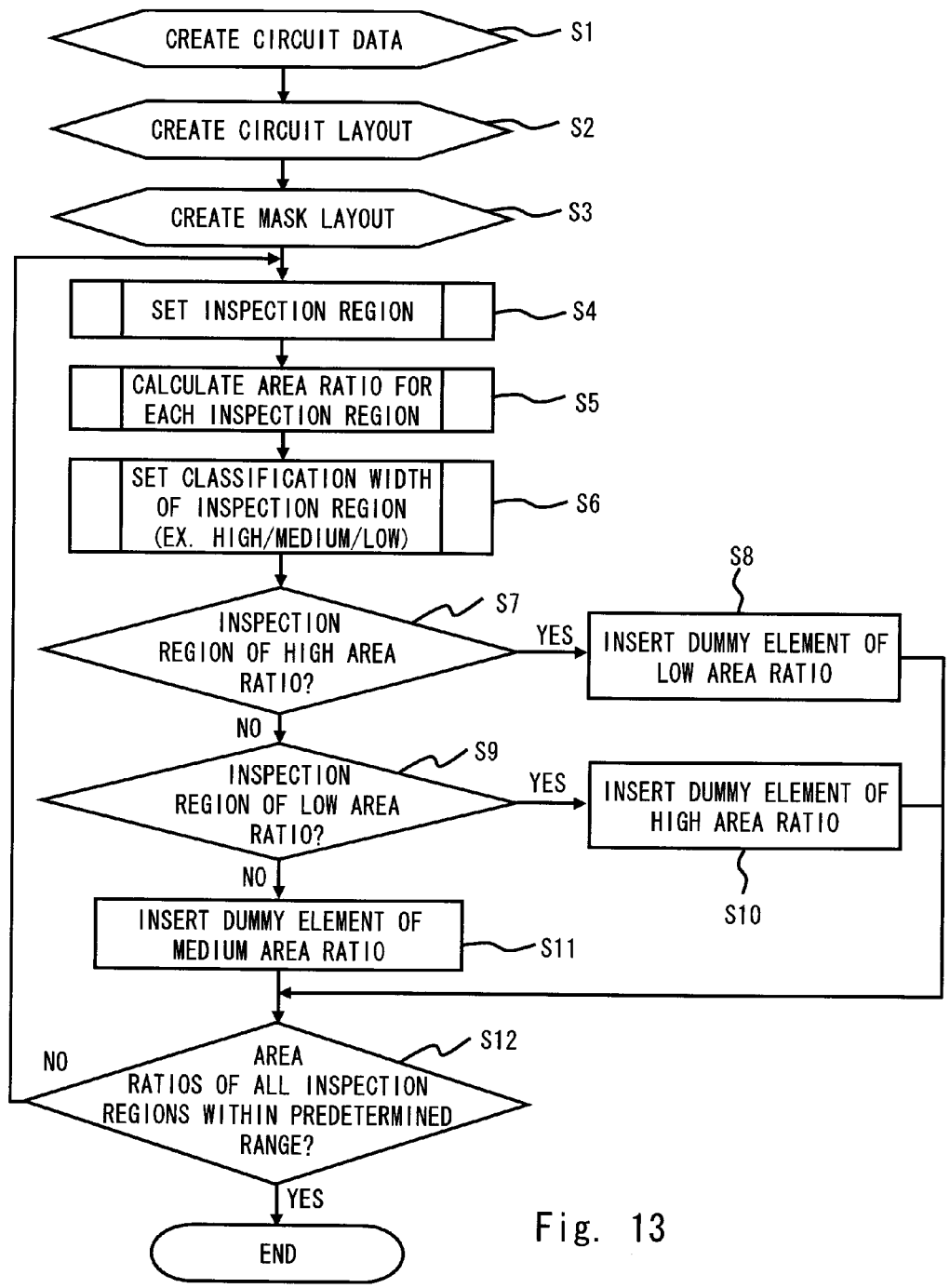
FIG. 13 is a flow chart of a design method of the semiconductor device according to the first exemplary embodiment.

Now, a process flow of the design method of the semiconductor device according to the first exemplary embodiment will be described. FIG. 13 shows a flow chart of the design method of the semiconductor device according to the first exemplary embodiment. As shown in FIG. 13, in the design method of the semiconductor device according to the first exemplary embodiment, circuit data forming the semiconductor device is created (step S1). Then, a circuit layout is created based on the circuit data that is created in step S1 (step S2). Then, a mask layout (layout data) is created for the circuit layout (step S3).

In the first exemplary embodiment, the layout data is further corrected based on the area ratio. In the correction process, the inspection regions obtained by dividing the layout data are set (step S4). At this time, the size of the area of the inspection region is preferably changed according to the type of the annealing process. For example, in the spike lamp annealing, one inspection region is 1 to 10 mm by 1 to 10 mm; in the millisecond annealing, one inspection region is 50 to 500 µm by 50 to 500 µm. It is preferable that the area of the inspection region is determined in consideration of the heat diffusion distance according to the type of the annealing process. Next, the area ratio is calculated by any one of the first calculation method to third calculation method for each inspection region that is set (step S5). Note that only one of the first to third calculation methods is applied for one layout data.

Subsequently, the inspection region is classified into any of the region having high area ratio, the region having medium area ratio, and the region having low area ratio based on the area ratio calculated in step S5 (step S6). A dummy element having low area ratio is inserted to the inspection region having high area ratio (steps S7, S8). Further, a dummy element having high dummy area ratio is inserted to the inspection region having low area ratio (steps S9, S10). Further, a dummy element having medium area ratio is inserted to the inspection region having medium area ratio (step S11). After that, it is judged whether the area ratios of all inspection regions including the dummy elements are within a predetermined range (for example, within a range that the area ratio is judged to be medium) (step S12). When it is judged in step S12 that any area ratio is out of the predetermined range, the processing of step S4 and the subsequent steps are executed again. Otherwise, when the area ratios of all inspection regions are within the predetermined range, the processing is completed.

Figure 14:
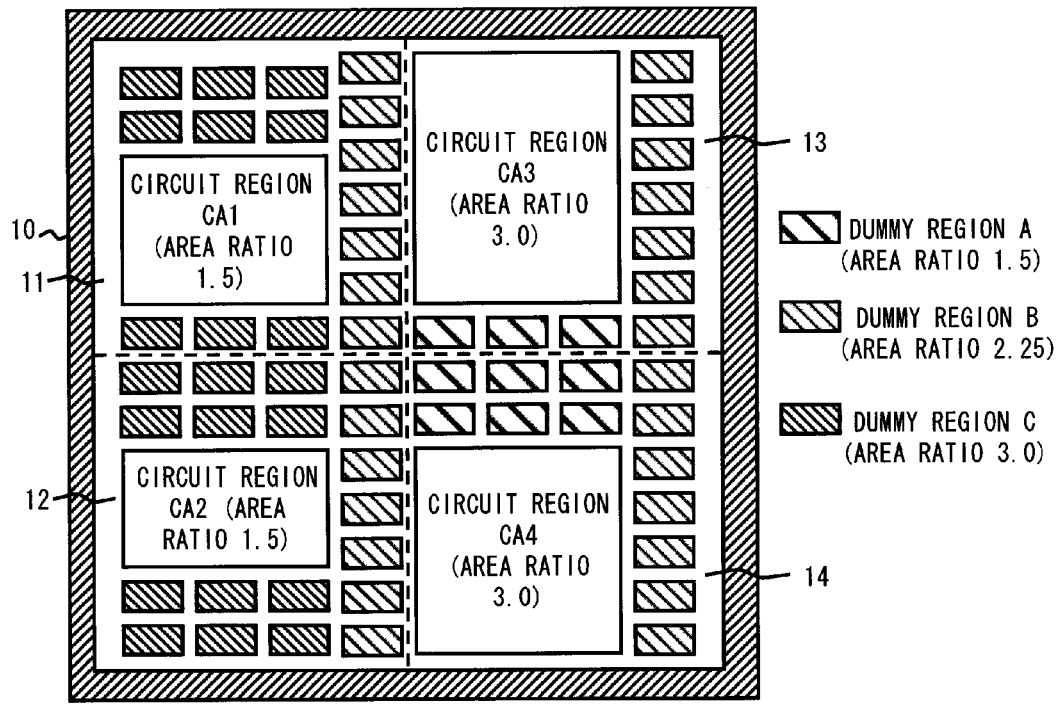
FIG. 14 is a schematic diagram showing a layout of a semiconductor device into which dummy elements are inserted using the design method of the semiconductor device according to the first exemplary embodiment.

Now, the process of inserting the dummy elements in the flow chart stated above will be described in detail. FIG. 14 shows a schematic diagram of the layout in which the dummy elements are inserted. In the example shown in FIG. 14, the area ratio of the whole chip is made close to 2.25. In the example shown in FIG. 14, the circuit forming region is set within a semiconductor chip 10. Inspection regions 11 to 14 are defined in the circuit forming region.

The inspection regions 11 and 12 include circuit regions CA1 and CA2, respectively. When the dummy element is not arranged, the area ratio of the inspection regions 11 and 12 is 1.5. The inspection regions 11 and 12 have the area ratio which is smaller than the target area ratio (2.25). Then, a dummy region C in which the dummy elements having the area ratio of 3.0 are arranged and a dummy region B in which the dummy elements having the area ratio of 2.25 are arranged are inserted into the inspection regions 11 and 12. By inserting the dummy region C and the dummy region B, the area ratio of the inspection regions 11 and 12 approaches 2.25.

The inspection regions 13 and 14 include circuit regions CA3 and CA4, respectively. When the dummy element is not arranged, the area ratio of the inspection regions 13 and 14 is 3.0. In short, the area ratio of the inspection regions 13 and 14 is larger than the target area ratio (2.25). Then, a dummy region A in which the dummy elements having the area ratio of 1.5 is arranged and the dummy region B in which the dummy elements having the area ratio of 2.25 is arranged are inserted into the inspection regions 13 and 14. By inserting the dummy region A and the dummy region B, the area ratio of the inspection regions 13 and 14 approaches 2.25.

As described above, according to the design method of the semiconductor device according to the first exemplary embodiment, the dummy elements according to the area ratio of the inspection region are inserted for each inspection region obtained by dividing the semiconductor chip. The design method of the semiconductor device according to the first exemplary embodiment sets the area ratio of each inspection region to be within the predetermined range, thereby suppressing the variations of the area ratio of the whole chip. Accordingly, in the design method of the semiconductor device according to the first exemplary embodiment, it is possible to suppress temperature variations of the semiconductor substrate, and to suppress characteristic variations of the MOS transistor caused in the annealing process.

Further, in the semiconductor device designed by the design method of the semiconductor device according to the first exemplary embodiment, the difference between the first region area and the second region area is within a predetermined range. The first region area indicates a sum of an area of a plane that a first member contacts with a second member, the first member forming the circuit element and the dummy element arranged in a first inspection region, the second member having different heat reflective properties from the first member, the second region area indicating a sum of an area of a plane that a first member contacts with a second member, the first member forming the circuit element and the dummy element arranged in a second region having the same area to the first region, the second member having different heat reflective properties from the first member. In summary, the semiconductor device designed by the design method of the semiconductor device according to the first exemplary embodiment has a small difference of the area ratio of each inspection region. Thus, the heating variations can be suppressed in the annealing process, thereby obtaining excellent properties with small characteristic variations of semiconductor elements.

The area ratio in the inspection region is preferably from 1.0 to 2.5. Further, the difference of the area ratio between the inspection regions is preferably from 0.05 to 0.3. By setting the area ratio to such values, the temperature variations can be efficiently suppressed.

Figure 15:
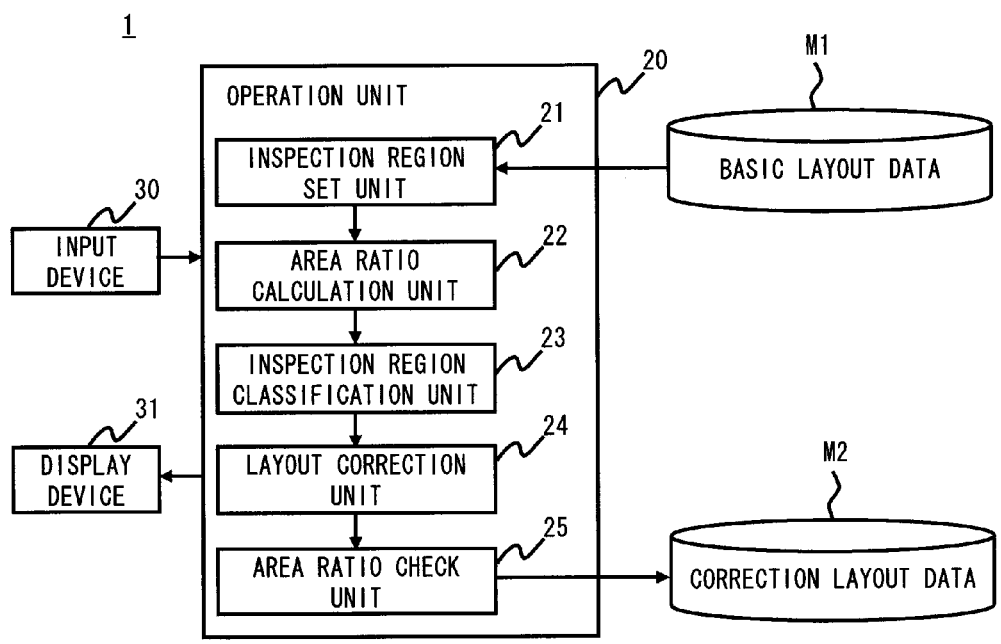
FIG. 15 is a block diagram of a design apparatus of the semiconductor device according to the first exemplary embodiment.

The design method of the semiconductor device can be implemented by hardware or a program that achieves the process flow of the design method. First, description will be made of a design apparatus 1 (hardware) that attains the design method of the semiconductor device according to the first exemplary embodiment. FIG. 15 shows a block diagram of the design apparatus 1 of the semiconductor device according to the first exemplary embodiment.

As shown in FIG. 15, the design apparatus 1 includes an operation unit 20, storing units M1, M2, an input device 30, and a display device 31. The storing unit M1 stores the layout data created in the step S3 in FIG. 13 (hereinafter referred to as basic layout data). Further, the storing unit M2 stores the layout data after the dummy elements are inserted in the operation unit 20 (hereinafter referred to as corrected layout data). The input device 30 is an input interface that allows a user to perform operation on the operation unit 20. The display device 31 displays processing executed in the operation unit 20 or an operation interface to the user.

The operation unit 20 includes an inspection region set unit 21, an area ratio calculation unit 22, an inspection region classification unit 23, a layout correction unit 24, and an area ratio check unit 25. The inspection region set unit 21 performs the processing of step S4 shown in FIG. 13. More specifically, the inspection region set unit 21 reads out the basic layout data from the storing unit M1 and sets a plurality of inspection regions for the basic layout data which is read out. The area ratio calculation unit 22 performs the processing of step S5 shown in FIG. 13. More specifically, the area ratio calculation unit 22 calculates the area ratio of the first area and the second area. The first area indicates an area of the inspection region, and the second area indicates a sum of a surface area of a second member, the second member contacting with the first member constituting a circuit element included in the inspection region, the second member further having different heat reflective properties from the first member. The inspection region classification unit 23 performs the processing of step S6 shown in FIG. 13. More specifically, the inspection region classification unit 23 classifies the inspection region into any of the region having high area ratio, the region having medium area ratio, and the region having low area ratio based on the area ratio calculated in the area ratio calculation unit 22. The layout correction unit 24 performs the processing of steps S7 to S11 shown in FIG. 13. More specifically, the layout correction unit 24 arranges the dummy element for each inspection region based on the area ratio of the inspection region, and adjusts the area ratio to be within the predetermined range in any inspection region. The layout correction unit 24 then generates the corrected layout data obtained by correcting the basic layout data. The area ratio check unit 25 then performs the processing of step S12 shown in FIG. 13. More specifically, the area ratio check unit 25 checks whether the area ratio is within the predetermined range for each inspection region with respect to the corrected layout data. Upon judgment that the area ratios of all inspection regions are within the predetermined range, the area ratio check unit 25 stores the corrected layout data generated by the layout correction unit 24 to the storing unit M2.

As described above, by using the design apparatus 1, steps S4 to S12 in the process flow shown in FIG. 13 can be executed. When the design method of the semiconductor device according to the first exemplary embodiment is implemented by a program, an operation unit such as a CPU (Central Processing Unit) may execute a program for executing processing corresponding to the inspection region set unit 21, the area ratio calculation unit 22, the inspection region classification unit 23, the layout correction unit 24, and the area ratio check unit 25.

The present invention is not limited to the exemplary embodiment described above, but may be changed as appropriate without departing from the spirit of the present invention. For example, although the area ratio is made closer to 2.25 in the exemplary embodiment stated above, the area ratio of each inspection region may be adjusted to a higher or lower value.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A design method of a semiconductor device, comprising:
   setting an inspection region of layout data generated based on circuit data;
   calculating an area ratio of a first area to a second area, the first area indicating an area of the inspection region, the second area indicating a sum of a surface area of a plane that a first member contacts with a second member, the second member contacting with the first member constituting a circuit element included in the inspection region, the second member further having different heat reflective properties from the first member; and
   arranging a dummy element in the layout data so that the area ratio is within a predetermined range in each inspection region of the layout data.

2. The design method of the semiconductor device according to claim 1, wherein the surface area at least comprises a sum of an area of a side wall of the second member included in the inspection region.

3. The design method of the semiconductor device according to claim 1, wherein
   the first member is a diffusion region, and the second member comprises at least one of a device isolation region and a gate electrode.

4. The design method of the semiconductor device according to claim 1, wherein the dummy element is the second member.

5. The design method of the semiconductor device according to claim 1, wherein the area ratio of the inspection region is from 1.0 to 2.5, and the difference of the area ratio between inspection regions is from 0.05 to 0.3.

6. A design apparatus of a semiconductor device that corrects layout data generated based on circuit data in consideration of variations occurred in manufacturing, the design apparatus comprising:
an inspection region set unit that sets a plurality of inspection regions obtained by dividing the layout data;
an area ratio calculation unit that calculates an area ratio of a first area to a second area, the first area indicating an area of the inspection region, the second area indicating a sum of a surface area of a plane that a first member contacts with a second member, the second member contacting with the first member constituting a circuit element included in the inspection region, the second member further having different heat reflective properties from the first member; and
a layout correction unit that arranges a dummy element for each inspection region based on the area ratio to adjust the area ratio so that the area ratio is within a predetermined range in each of the inspection regions.

7. The design apparatus of the semiconductor device according to claim 6, wherein
the second area at least comprises a sum of an area of a side wall of the second member included in the inspection region.

8. The design apparatus of the semiconductor device according to claim 6, wherein
the first member is a diffusion region, and
the second member comprises at least one of a device isolation region and a gate electrode.

9. The design apparatus of the semiconductor device according to claim 6, wherein the dummy element is the second member.

* * * * *